No. 750,086. PATENTED JAN. 19, 1904.
T. CARROLL.
CASH REGISTER.
APPLICATION FILED JULY 23, 1900.
NO MODEL. 5 SHEETS—SHEET 5.

Witnesses
Wm. McCarthy
Wm H. Muzzy

Inventor
Thomas Carroll
By Alvan Macauley
Attorney

No. 750,086. Patented January 19, 1904.

UNITED STATES PATENT OFFICE.

THOMAS CARROLL, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 750,086, dated January 19, 1904.

Application filed July 23, 1900. Serial No. 24,541. (No model.)

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

My invention relates to improvements in cash-registers.

The present embodiment of my invention is in the form of the so-called "detail-adding" type of cash-register; but some of the features are adapted to cash-registers generally, and their use is not restricted to any particular kind or type.

In the accompanying drawings, forming part of this specification, Fig. 3 represents a detail top plan view of the keys and the shiftable key-coupler. Fig. 4 represents a detail top plan view of the adding-wheels and cabinet over the same with the movable guard or shutter. Fig. 4ᵃ represents a detail plan view of the slide which closes the opening through which the numbers on the adding-wheels are read.

In the accompanying drawings, 1 represents the frame of the machine; 2, the amount-keys; 3, the indicators; 4, the cash-till, and 5 the detail-registering wheels.

Figures 1, 7:
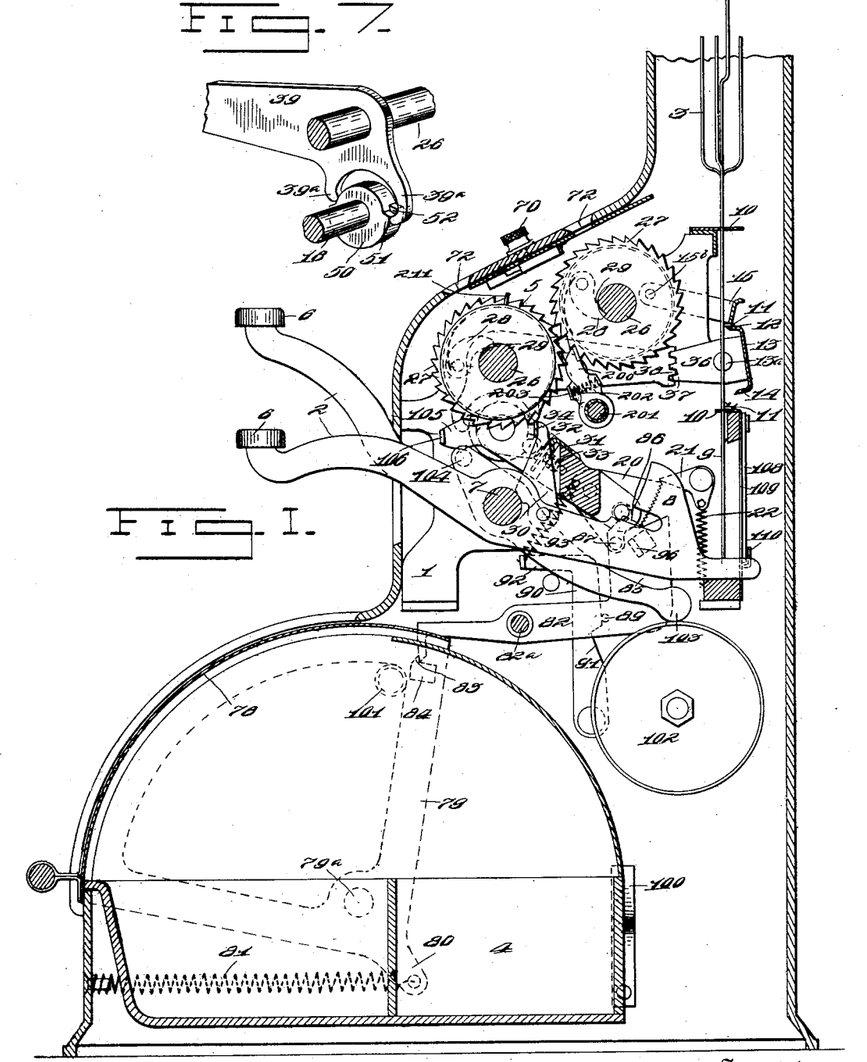
Figure 1 represents a vertical central section, partly broken away, through the machine embodying my invention.
Fig. 7 represents a detail perspective view of one end of the coupler-shaft and the lever for operating the indicating supporting-wing.

The keys 2 are formed like those shown in the patent to Boyer and Riggs, No. 422,287, granted February 25, 1890, and the coöperation of the keys, indicators, key-coupler, and adding-wheels is in a general way like that of the corresponding parts shown and described in said patent, though there are important differences which shall be presently pointed out. As in said patent, the keys are hung centrally upon a transverse shaft 7, which extends between two sides of the machine. Upon the front end of each key is secured the usual finger-button 6, and each key has near its rear end a slotted plate 8, coöperating with the key-coupler. The vertical indicator-stems pass through vertical apertures in the upper and lower guide-plates 10, which extend transversely and are secured to the main frame. As shown in the drawings, the indicator-tablets are preferably formed integral with their stems, and the latter are each provided with a rearwardly-extending shoulder or supporting-lug 11. In normal position the supporting-shoulder rests upon the lower guide 10. When a key is operated, its indicator is thereby raised in the usual manner. The supporting-shoulder passes completely above both the upper flange 12 and the lower flange 14 of the indicator-supporting frame 13. The latter extends the entire length of the machine close to the rear side of the indicator-stem, and it has two short arms (one at each end) which are pivoted at 13ᵃ to the frame of the machine. Suitable means, to be presently described, is provided so that as soon as the supporting-shoulder passes the lower flange 14 the frame is rocked, thereby bringing the lower flange forward into the paths of the shoulders of the unoperated indicators and swinging the upper flange backward, so that the shoulder of the operated indicator passes on to the highest point of its movement. Shortly thereafter the indicator-supporting frame is swung backward to normal position, as shown in Fig. 1, so that the shoulder of the operated indicator is caught and the indicator thereby retained in its elevated position until the indicator-supporting frame is again rocked by the succeeding operation of a key. When released by the supporting-frame, the operated indicators drop back to normal position of their own weight; but in order to insure their starting downward promptly I provide a starting-yoke 15, which extends transversely of the machine near the rear side of all the indicator-stems, and has short arms (one at each end) which are pivoted at 15ᵇ to the main frame of the machine. As an indicator rises above the supporting-frame 13 its shoulder strikes the starting-yoke and raises it, and so long as the indicator is in raised position the starting-yoke rests upon its shoulder. When the indicator is released, the weight of the starting-yoke compels the indicator to promptly start downward. In some cases it is desirable to employ a spring 15ᵃ, which is attached at one end to the main frame and at the other to the starting-yoke in order that the latter may act more quickly.

The key-coupler 16 is in the usual form of a universal bar—that is, it comprises side arms 17, which are provided with trunnions 18, pivoted in the main frame. Said trunnions are made longer than ordinary, so that the key-coupler may be reciprocated longitudinally in addition to being swung upon its trunnions in the usual manner. At their rear ends the side arms of the key-coupler are connected by a rod 19, which extends across and rests upon all of the keys just at the mouth of the key-coupler slot in the plate 8. The key-coupler coöperates with said slot to couple simultaneously-operated keys and to lock the unoperated keys from operation in a manner now well known in the art and as shown and described in the aforesaid patent, No. 422,287.

A full stroke of the key-coupler in either direction is assured by a segmental ratchet 20, formed on a plate which is secured to one of said arms 17 and coöperating with a pawl 21, pivoted upon the main frame and held in its normal position (shown in Fig. 1) by a spring 22, which connects it to the main frame. This pawl is of sufficient width to engage the ratchet in either of the positions to which the latter is adjusted by the longitudinal movement of the coupler (see Fig. 3) and is reversed at the ends of the respective strokes in a manner well known in the art.

The aforesaid longitudinal movements are imparted to the key-coupler by conical projections 23 and 24, mounted on the main frame, at opposite ends thereof, and one, 24, higher than the other, 23, and both in position to be engaged by similar projections 25 on the opposite ends of the coupler. As the coupler approaches the limit of its upward stroke the projection 24 is struck by the right-hand projection 25 and the coupler thus shifted longitudinally to the left. The projection 23 is engaged near the termination of the downward stroke, and thus forces the coupler to the right and back to its normal position. When the key-coupler is shifted to the left at the termination of its upward stroke, there is danger of rebound should the stroke be quick or violent, and to guard against such a result I pivot a stop-lever 16ᵃ on one of the coupler-journals. This lever is formed at its free end with a lug 16ᵇ and is normally drawn downward by a coiled spring 16ᶜ, which connects it to the main frame. The lever is limited in its movements by a pin 16ᵈ, mounted on the main frame and projecting into an elongated slot 16ᵉ, formed in said lever. The length of the slot 16ᵉ is such that when the coupler is in its lowermost position the lug 16ᵇ is above the coupler. When the coupler is elevated, it contacts with the lug 16ᵇ and raises the lever 16ᵃ, putting the spring 16ᶜ under tension. When the coupler moves to the left at the termination of its upward stroke, the lug 16ᵇ is left free of the coupler and descends under the stress of the spring 16ᶜ, so as to engage the right-hand end of the coupler, and thus prevent it moving laterally until it has passed so far down as to be again free of said lug.

Figure 8:
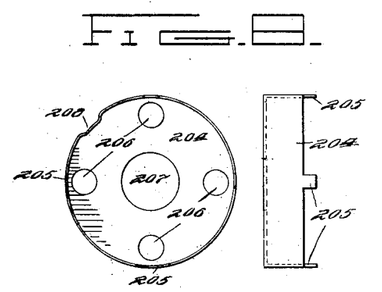
Fig. 8 represents an end and a side elevation of the stamped cup forming one portion of one of the counter-wheels.
Figure 10:
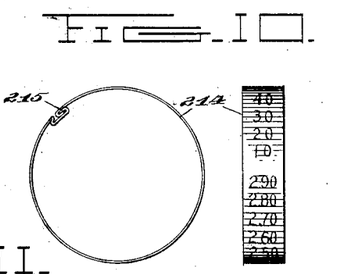
Fig. 10, similar views of the numbered band.
Figure 11:
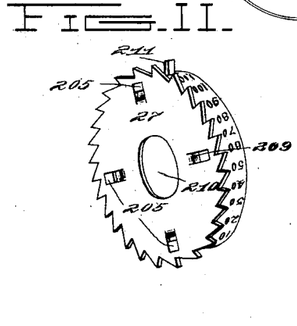
Fig. 11 represents a detail perspective view of the entire wheel.
Figure 12:
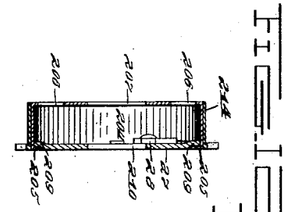
Fig. 12 represents a central vertical section through the assembled wheel.
Figure 13:
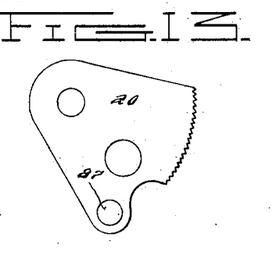
Fig. 13 represents a detail side elevation of the full-stroke rack-plate and its stud.

Coöperating with each of the keys is a pair of adding-wheels, as shown in Fig. 1. The primary adding-wheels are mounted on the lower shaft 26. The coöperating secondary adding-wheels are mounted upon the upper shaft 26. The construction of these wheels is substantially identical. Each primary adding-wheel, however, is provided with a transfer pin or stud 211, which operates in the usual manner to turn the secondary adding-wheel the distance of one tooth whenever the primary adding-wheel has completed a revolution. Each adding-wheel comprises a cylindrical supporting body portion 204, the ratchet-wheel disk 27, and the usual numbered wheel-band 214, as shown in Fig. 10. As shown in Fig. 8, the body portion 204 is formed with four lips 205, four apertures 206, a central journal-aperture 207, and a peripheral recess 208. The ratchet-wheel disk is formed with the usual ratchet-teeth and has stamped therein four tongues 209. When the wheel is assembled, the lips 205 of the body portion are passed through the apertures formed in the ratchet-wheel disk by the tongues 209. In this position the four apertures 205 are directly opposite the tongues 209. A setting-tool is then operated through the apertures 206 to bend the lips 205 inward behind the tongues 209. At the same time the tongues 209 are partly straightened out, from which it results that the lips are clenched behind the tongues and the two parts are securely fastened together. The numbered wheel-band shown in Fig. 10 is finally slipped over the supporting body portion, its clenched ends 215 fitting within the peripheral recess 208, which not only thereby preserves the external cylindrical contour of the wheel-band, but also prevents the latter from slipping around the body portion and properly alines the numbers on the wheel-band, so that when the shaft 26 is turned the wheel-bands will all simultaneously show "0" through the reading-opening. In this way I am able to manufacture a light but strong adding-wheel at a comparatively slight cost.

In order to prevent any retrograde movement of the adding-wheels when the keys return to normal position, I have provided each primary adding-wheel and its coöperating secondary adding-wheel with a pair of retaining-pawls 200, which are pivoted upon the transverse shaft 201. These pawls respectively engage the ratchet-teeth 27 of the adding-wheels. An expansion-spring 202, which abuts at its opposite ends against ears 203, one of which is formed on each pawl, tends to swing the retaining-pawls away from each other and in this manner holds them firmly in engagement with the said ratchet-teeth.

Figures 2, 5, 6, 14:
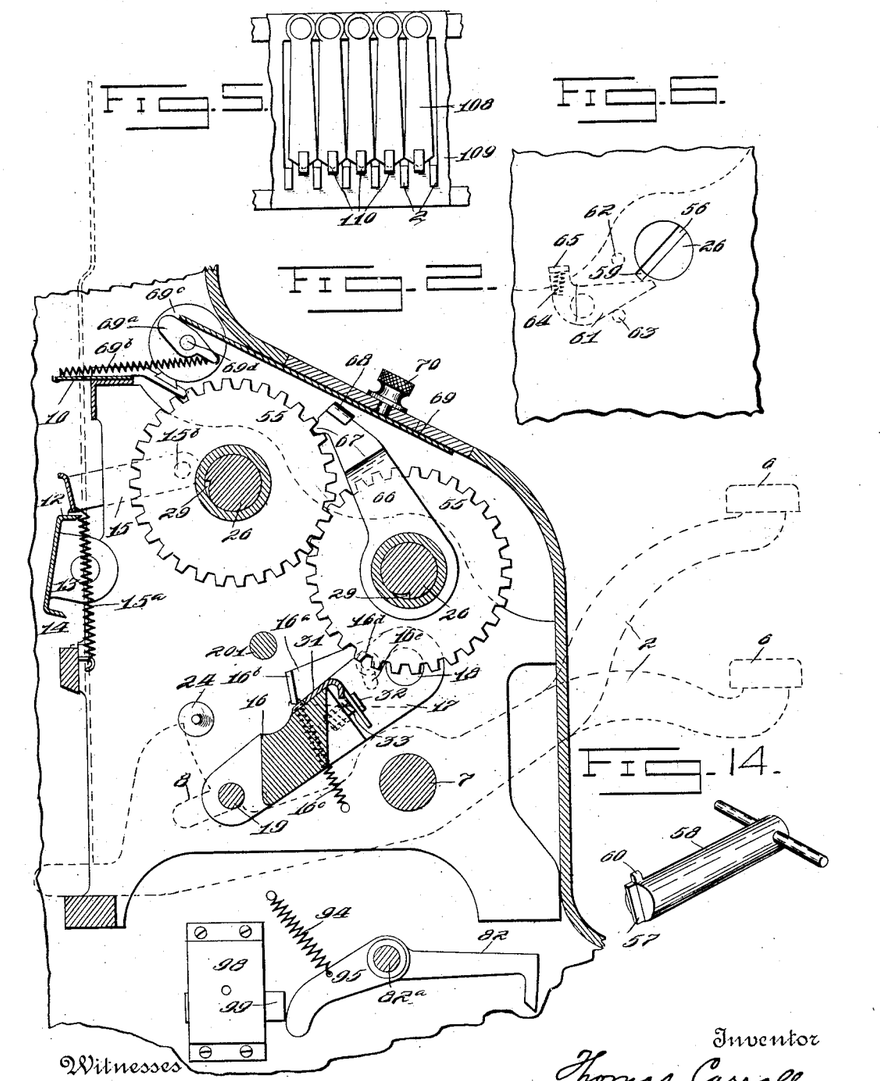
Fig. 2 represents a similar view taken near one end of the machine, the cash-till and cover being omitted.
Fig. 5 represents a detail rear elevation of the key hangers or stops.
Fig. 6 represents a detail side elevation of the stop-pawl of the turn-to-zero devices.
Fig. 14 represents a detail perspective view of the turn-to-zero wrench.
Figures 2, 15:
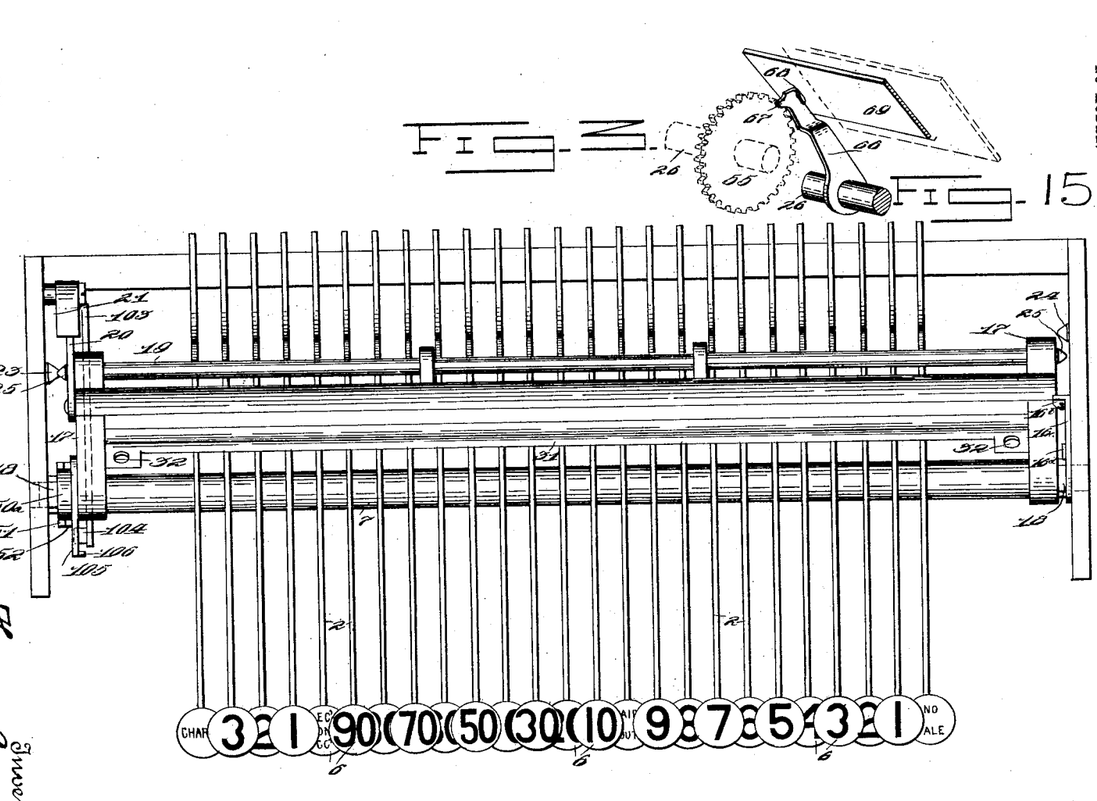
Fig. 15 represents a detail perspective view of the device for locking the turn-to-zero mechanism.

Each shaft 26 is provided at one end with a gear-wheel 55, as shown in Fig. 2, said gears intermeshing, so that the shafts must move together when one is rotated to turn the counter-wheels to "0." The upper shaft 26, as shown in Fig. 6, is formed at one end with a groove 56, into which a flange 57 of a wrench 58 (see Fig. 8) may be inserted to rotate said shaft. When the shafts 26 are in normal position, the groove 56 is in alinement with a notch 59, formed in the cabinet, and the wrench may be freely inserted, a lug 60, formed thereon, passing through said notch. After the movement of the wrench has commenced the lug passes out of alinement with the notch 59 under the metal case of the machine, and the wrench is thus locked against withdrawal until it has made a complete revolution and the lug has again come into alinement with the notch.

In order to positively arrest the wrench when the zero position is reached, the lug 60 contacts with the end of a pawl 61, pivoted upon the cabinet, Fig. 6, and forces the same upward against a stop-pin 62, also mounted on the cabinet. The pawl is held in its normal position against a stop-pin 63, mounted on the cabinet, by a coiled spring 64, interposed between the main frame and a lug 65, formed on the pawl. Thus when the pawl is in its normal position (shown in Fig. 6) and the wrench is applied the lug 60 will project above the inner end of the pawl 61 and will not contact therewith until it has made a complete revolution, when it will force said pawl up against the stop 62, as before described.

Figures 4, 4A:
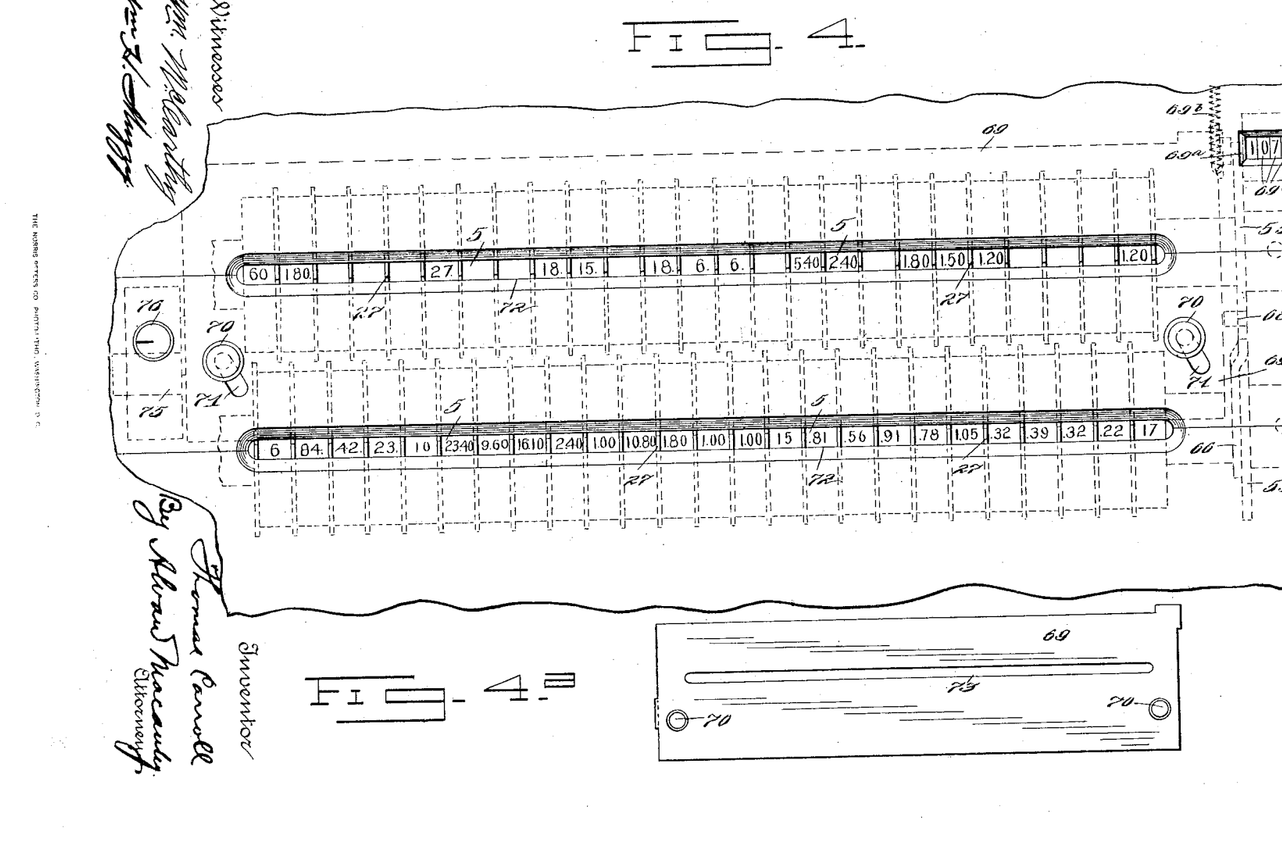

After the wrench is withdrawn the pawl assumes its normal position under the action of the spring 64, and is thus ready for the next operation. The upper gear-wheel 55 is normally locked by a pivoted locking-lever 66, journaled on the lower shaft 26 and provided with a locking-nose 67, which engages the teeth of said wheel. The locking-lever is further provided with a locking-lug 68, which normally prevents the lever from moving by contacting with the under side of a guard 69. (Better shown in Figs. 4 and 4ª on a reduced scale.)

The guard consists of a flat plate, which is located against the under side of the case of the machine and just above the adding-wheels. The case is provided with two parallel longitudinal slots, through which may be read the amounts shown on the adding-wheels. The guard is provided near its ends with two operating-knobs 70, the stems of which are secured to the guard and extend out through diagonal slots 71 in the case. When the guard is in position to expose the figures on the adding-wheels, one edge of the guard is just above the upper edge of the lower reading-slot 72, Fig. 1, and in this position the longitudinal slot 73 of the guard exactly registers with the upper reading-opening 72 in the case, so that the figures are exposed on both of the sets of adding-wheels. It is preferable to normally have the adding-wheels hidden, and under the construction just described to accomplish this result it is only necessary to grasp the knob 70 and slide the guard diagonally downward, which immediately covers both of the reading-openings. A lock 76 is provided, and the guard may be locked in the position in which it hides or covers the adding-wheels through the bolt 75, which may be shot by means of the usual key.

Figure 9:
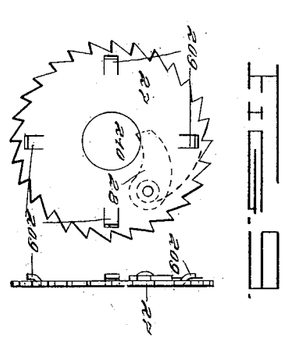
Fig. 9 represents similar views of the stamped ratchet-wheel.

Only the proprietor or other person in authority carries a key to the lock 76, and in order to prevent the adding-wheels being reset by other than an authorized person I provide means whereby the resetting devices are locked except when the guard is in position to expose the adding-wheels. Consequently only the person having a key to lock 76 can reset the machine. To this end, as already stated and as shown in full lines in Fig. 9, when the guard is in closed position the right-hand end thereof contacts with the free end of the locking-lever 66, and while the lever is thus engaged it cannot be forced out of engagement with the gear 55, and consequently the adding-wheels cannot be turned to zero. When, however, the guard is shifted to the left to expose the numbers on the adding-wheels, the right-hand end of the guard passes from over the locking-lever 66, and then when the wrench 58 is applied and the wheels turned the locking-lever will be automatically forced out of engagement with the gear 55. The nose 67 of said lever is, however, of such shape that it prevents any retrograde resetting movement.

For the purpose of keeping a record of the number of times the slide has been moved to disclose the adding-wheels or to reset them to zero I have provided a series of counter-wheels 69$^c$, which count a unit whenever the central shaft 69$^d$ is rocked. Mounted upon the left-hand end of said shaft is a short lever 69$^a$, one end of which is connected to a fixed portion of the frame by the spring 69$^b$. It will readily be understood from this construction that whenever the guard is shifted its right-hand upper corner strikes the lever 69$^a$ and counts one upon the counter 69$^c$.

Motion is imparted to the primary counter-wheels—that is, those of the lower series—by pawls 30, pivoted upon the respective keys and normally held against the shaft 7 by an angular spring-pressed plate 31, mounted on the coupler. This plate is held in position on the coupler by headed screws 32, mounted on said coupler and extending through apertures in the plate. These screws are surrounded by coiled springs 33, which bear against the coupler and said plate to normally force the latter forward into engagement with the backs of the pawls, as shown in Fig. 1. Each pawl is further provided with a laterally-projecting lug 34, which when the key is operated engages its respective ratchet-wheel 27 and moves the same the distance of one tooth. As the pawl passes upward the plate 31 becomes depressed and finally reaches its limit of movement as the key completes its stroke. As the pawl is now locked by the plate 31 against any further backward movement, all overthrow of the wheel is prevented, as in order for the wheel to have any additional movement the pawl would have to be forced farther back by the tooth following that against which the lug 34 is engaged.

The key-coupler, with its longitudinal and rocking movement, provides the means whereby the indicator-supporting frame 13 is positively operated to release the elevated indicators and to allow the operated indicators to rise. This is effected by a rigid arm 36, mounted on the supporting-frame and provided at its forward end with gear-teeth 37, meshing with which are like teeth 38, formed on the bell-crank lever 39, Fig. 7, which is pivoted upon the lower shaft 26. The lever 39 has near its front end two pendent operating-noses 39$^a$, which are arranged to straddle and engage at diametrically opposite points a cam-disk 50, which is rigidly secured upon the left-hand one of the trunnions 18 of the universal bar or key-coupler. Said disk is wide enough that the operating-noses 39$^a$ will engage near one edge of the periphery of the cam-disk while the key-coupler is rising and will engage near the other edge when the key-coupler is descending, because it will be remembered that the key-coupler is shifted longitudinally just before it begins its return or downward movement. In this manner the operating-noses 39$^a$ are held to engagement with the periphery of the cam near the edge 51 during the upward movement of the key-coupler and near the edge 52 during the return movement thereof, and these two parts of the periphery are differently formed, as shown, so that thereby the supporting-frame 13 is caused to move properly, first, to drop the exposed indicator; second, to permit the supporting-shoulder on the operated indicator to be raised; third, to interpose the lower flange 14 into the path of the shoulders of the unoperated indicators, and, fourth, to engage under the shoulder of the operated indicators and support it in its raised position.

The till 4 is stationary and is provided with a curved cover 78, supported at opposite ends by segmental frames 79, which are suitably pivoted at the opposite sides of the main frame at 79$^a$, and one of them is provided with a pendent arm 80, to which is connected a coiled spring 81, the opposite end of which is suitably connected to the main frame. When the cover is in the closed position shown in Fig. 1, the spring 81 is under tension, so that when the cover is released it will by said spring be rocked back to uncover the till. The cover is held in its normal position by pivoted latch-levers 82, suitably mounted on a rock-shaft 82$^a$ and engaging noses 83, formed on blocks 84, fast to the respective till-cover frames 79. The left-hand lever 82 is provided at its rear end with a vertical extension or plate 85, having a beveled edge 86, arranged to be engaged by a pin 87, mounted on the left-hand arrester ratchet plate. During the time that the coupler moves upward the pin 87 is to the right of the plate 85; but as the coupler is moved laterally to the left at the end of its upward stroke the said pin is brought directly over the plate, and upon the descent of the coupler the pin engages the beveled edge 86 and forces the plate 85 downward, thus rocking the lever 82 to disengage it from the nose 83. The till-cover thereupon is released and swings open. The said lever 82 carries a pin 89, which forms a stop for a latching-pawl 90 and coöperates with a latching-notch 91, formed in said pawl. This pawl is provided at its upper end with an angular extension 92, to which is connected one end of a coiled spring 93, the opposite end of said spring being connected to the key-coupler. When the coupler is in its normal position, this spring 93 is under very little tension; but as the coupler is raised the tension is increased. Now as the coupler moves down again the lever 82 is depressed, as before described, which action moves the pin 89 and brings it in alinement with the notch 91 and allows the pawl 90 to spring rearward. The lever 82 is now held in its unlatched position until the final downward movement of the key-coupler, when the tension of the spring 93 is so reduced as to be overcome by the greater tension of a spring 94, (at the other end of the machine,) which connects an arm 95, mounted on the shaft 82$^a$, to the main frame. When the tension of the spring 93 is so reduced that it is less than that of the spring 94, the shaft 82$^a$ is rocked by the latter spring, returning the levers 82 to normal position and forcing the pin 89 out of the notch 91 into its normal position. (Shown in Fig. 1.)

In order to prevent any operation of the keys while the till-cover 78 is open, I provide the plate 85 with a locking-lug 96, arranged upon the inner side of the same. Upon the final return stroke of a key the plate 85 moves upward, as before described, and as the blocks 84 on the cover-frames 79 are at that time out of the paths of the locking-noses of the levers 82 said plate moves past its normal position, so as to bring the lug 96 into the path of the pin 87, and thus prevents operation of the machine. As long as the till-cover remains open the levers 82 remain in this position and the machine remains locked. When the cover is closed, however, the levers are returned to the positions shown in Fig. 1, and the locking-lug 96 is moved out of the path of the pin 87.

As it is sometimes desirable to so adjust the machine that the keys may be operated while the till-lid is still open, I provide the cabinet with a suitable lock 98, the bolt 99 of which is arranged to form a stop for the arm 95, as shown in Fig. 2. When the bolt 99 is shot into the position shown in this figure, the shaft 82$^a$, and consequently the plate 85, are not allowed sufficient movement under the action of the spring 94 to move the lug 96 into the path of the pin 87, but are arrested in the normal position shown in Fig. 1. The lock 98 is controlled from the exterior of the machine by any suitable key.

When the lid 78 is released, it is drawn back by the spring 81, as aforesaid, and as considerable momentum is thus imparted to it means must be provided for bringing it to rest without shock. This means comprises plate-springs 100, secured to the cabinet or casing in such positions that their free ends will frictionally engage the sides of the frames 79 as the lid makes its final opening movement. The cabinent is further provided with two rubber buffers 101, which project into the cut-away portions of the frames 79 and form stops for the said frames.

The bell 102 is sounded upon each operation of the machine by a clapper 103, which is pivoted upon the shaft 7 and is provided with a laterally-projecting pin 104. This pin is arranged to be engaged by a cam-arm 105, fast to the key-coupler and provided at its outer end with a lateral lug 106. When the coupler is raised, the cam-arm 105 moves downward, and thus forces the pin 104 downward also and raises the inner end of the bell-clapper. When the coupler moves laterally at the end of its upper stroke, the lug 106 still holds the pin 104 in depressed position, and it is not until the initial reverse movement of the coupler that said lug passes out of the path of the pin and allows the clapper to descend and sound the bell.

The rear ends of the keys coöperate with pivoted hangers or stops 108 (see Fig. 5) to prevent the operation of more than one key in the same bank at the same time in a manner well known in the art. The slotted guide-plate 109, the upper end of which forms the upper flange 10, is also provided with angular lips 110, which pass up to the rear of the pivoted hangers or stops 108 and prevent them from "buckling" rearwardly, but at the same time allowing them free lateral movement.

Having thus described my invention, what I claim as new, and desire to secure by Letters Patent, is—

1. In a cash-register, the combination with a series of counting elements of a series of keys, a series of pawls mounted respectively on said keys, a movable member common to said keys and a spring-pressed device mounted on the movable member and common to all of the pawls to hold them to engagement with the counting elements.

2. In a cash-register, the combination with a series of keys, of a series of adding-wheels, pawls movably mounted on said keys for operating said adding-wheels, a member common to said keys, and a movable device on said member engaging said pawls to hold them all to their work in connection with the adding-wheels.

3. In a cash-register, the combination with a series of keys, of a series of adding-wheels, pawls mounted on said keys for operating said wheels, a member common to said keys, and a spring-pressed device mounted on said member and engaging all of said pawls to hold them to their work with spring-pressure.

4. In a cash-register, the combination with a series of keys, of a series of adding-wheels, a member common to said keys, operating-pawls for the adding-wheels mounted upon said keys, and movable spring means on the common member arranged to engage all of the operating devices and hold them to their work and prevent them from disengaging from the adding-wheels as they make their final movements.

5. In a cash-register, the combination with a series of keys, of a series of adding-wheels, pawls mounted on said keys for operating said wheels, a member common to said keys, and a spring-pressed plate mounted on said member and arranged to be moved against the tension of its springs by said pawls upon the operation of the keys and to finally arrest said pawls to prevent overthrow of the adding-wheels.

6. In a cash-register, the combination with a series of keys, of a series of adding-wheels provided with ratchet-wheels, pawls mounted on said keys and engaging said ratchet-wheels, a member common to said keys and a spring-pressed bar mounted on said member and engaging said pawls.

7. In a cash-register, the combination with a series of keys, of a cash-till, a movable cover for said till, a latch for said cover, a member common to said keys and adapted to have a lateral movement imparted to it, and a projection on said member so located as to be brought into position to operate the latch by the lateral movement of said member.

8. In a cash-register, the combination with a series of keys, of a cash-till, a latch for the till, and a movable member common to the keys and arranged to move in one vertical plane to operate the latch and in a second vertical plane to freely pass the latch without engaging it.

9. In a cash-register, the combination with a series of keys, of a series of adding-wheels, pawls mounted on said keys for operating said wheels, a member common to said keys, and a spring-pressed plate mounted on said member so as to have only a limited movement and engaging said pawls to hold them to their work and also to form a stop therefor.

10. In a cash-register, the combination with registering devices, of means for turning the same to zero including a gear, a pivoted pawl for locking said gear and a slide for obscuring the registering devices arranged to lock and unlock said pawl.

11. In a cash-register, the combination with a series of keys, of an oscillatory member common thereto and arranged to be swung laterally, and a movable device for holding said movable member in its lateral adjusted position during its oscillation.

12. In a cash-register the combination with the indicators having stems each formed with a shoulder, of an indicator-supporting frame having an upper flange and a lower flange, and means for swinging the lower flange over the shoulders of the unoperated indicator-stems to lock them when the upper flange is swung in position to permit the shoulders of the operated indicator-stems to pass it.

13. In a cash-register the combination with the indicators having stems each formed with a shoulder, of a coöperating supporting-frame arranged to retain the operated indicator in indicating position, and a starting yoke or frame arranged to bear upon the stems of the operated indicators, thereby tending to force the latter out of indicating positions.

14. In a cash-register the combination with the indicators having stems each formed with a shoulder, of a coöperating indicator-supporting frame, an arm carried by the frame, a pivoted lever which is jointed to said arm, and a shifting-cam for moving said lever to operate the indicator-supporting frame, substantially as described.

15. In a cash-register the combination with the indicator-stems each having a shoulder, of the indicator-supporting frame having an upper and a lower flange, and means to first move the lower flange outward to permit the passage of the shoulders of the operated indicator-stems, second, to interpose the lower flange into the path of the shoulders of the unoperated indicator-stems to lock the latter, and third, to move the upper flange under the shoulders of the operated indicator-stems so as to support the operated indicators in indicating position.

16. In a cash-register, the combination with a series of keys, of a cash-till, a movable cover for the same, a latch for said cover, means connected to the keys for operating said latch, means for preventing a second operation of the latch until the keys have returned to normal position and a variable spring device connected to said latter means.

17. In a cash-register, the combination with a cash-receptacle, of a cover for the same, a pivoted latch for said cover, a pivoted lever arranged to engage said latch to hold it in inoperative position and variable spring devices connecting said lever to the movable parts of the machine.

18. In a cash-register, the combination with registering devices, of means for turning the same to zero, a removable key for operating the turn-to-zero devices, and a pivoted stop-pawl for said key which must be operated before the key is inserted.

19. In a cash-register, the combination with a series of keys, of a cash-receptacle, a latch for said receptacle, a member common to said keys, and means for moving the member laterally so as to move it into and out of operative relation with the latch.

20. In a cash-register, the combination with a series of keys, of a cash-receptacle, a latch for the same, means connected to the keys for operating said latch, and variable spring devices for preventing a second operation of the latch until the keys have returned to normal position.

21. In a cash-register the combination with an operating mechanism, of a cash-receptacle, a latch for said receptacle, and variable spring devices intermediate the operating mechanism and said latch for preventing a second operation of the latter until said mechanism has returned to its normal position.

22. In a cash-register, the combination with an operating mechanism, of a cash-receptacle, a latch for said receptacle, a spring for controlling said latch, a locking device for the latch, and a spring connecting said locking device to the operating mechanism.

23. In a cash-register, the combination with an operating mechanism including a movable member having a vertical and a lateral movement, of a cash-receptacle, and a latching device for said receptacle adapted to be operated by the movable member.

24. In a cash-register, the combination with an operating mechanism including a movable member having a vertical and a lateral movement, of a cash-receptacle, a latch for the receptacle, and a projection on said member so located as to be brought into position to operate the latch by the lateral movement of said member.

25. In a cash-register, the combination with an operating mechanism including a movable member arranged to operate in two vertical planes and to be moved laterally from one to the other, of a cash-receptacle, and a latch for said receptacle arranged to be operated by the movable member when moving in one of its vertical planes but not in the other.

26. In a cash-register, the combination with an operating mechanism, of a cash-receptacle, a lock for said receptacle connected to the operating mechanism and arranged to lock said mechanism when it is not locking the receptacle.

27. In a cash-register, the combination with an operating mechanism including a series of keys, and a member common to said keys, of a cash-receptacle, and a latch for said receptacle arranged to lock the receptacle or the registering mechanism.

28. In a cash-register, the combination with an operating mechanism, of a cash-receptacle, a latch for said receptacle arranged to lock the operating mechanism when it is not locking the receptacle, and means for permanently holding the latch on one of its adjusted positions.

29. In a cash-register, the combination with registering devices, of a key for returning the same to zero, formed with a stop projection, and a movable spring-actuated stop device arranged to be engaged by the key projection to arrest the key and to move out of the path of the key projection when the key is withdrawn.

30. In a cash-register, the combination with a series of keys, of a movable member common to all of said keys, devices for shifting said member while it is being moved by said keys, an alarm, and means connected to the common member for sounding the alarm.

31. In a cash-register, the combination with a registering mechanism, of a slide for normally obscuring the same, an auxiliary registering device, and a spring-actuated member connected to the auxiliary device and arranged to be struck and operated by the slide.

32. In a cash-register, the combination with a registering mechanism including a movable member operable in two different vertical planes and movable laterally from one plane to the other, of a series of indicators, an indicator-support, and operating means intermediate the movable member and said support controlled by both the vertical and lateral movements of said member whereby different portions of said intermediate means are brought into operation by the lateral movement of said member.

33. In a cash-register, the combination with a series of keys, of a member common thereto and movable in two independent vertical planes and also laterally from one of said planes to the other, devices for giving said member a lateral movement because of its vertical movement, indicators, an indicator-support, and means intermediate the laterally-movable member and said support controlled by both the vertical and lateral movements of said member whereby different portions of said intermediate means are brought into operation by the lateral movement of said member.

In testimony whereof I affix my signature in the presence of two witnesses.

THOMAS CARROLL.

Witnesses:
JOHN C. LOCKYER,
CHAS. E. CRUSOE.